(12) United States Patent
Yagyu et al.

(10) Patent No.: US 11,479,115 B2
(45) Date of Patent: Oct. 25, 2022

(54) ATTACHMENT STRUCTURE OF GENERATOR AND WORKING MACHINE

(71) Applicant: KUBOTA CORPORATION, Osaka (JP)

(72) Inventors: Sumio Yagyu, Osaka (JP); Takao Nakagawa, Osaka (JP); Masaru Kawane, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 317 days.

(21) Appl. No.: 16/728,065

(22) Filed: Dec. 27, 2019

(65) Prior Publication Data
US 2020/0189387 A1 Jun. 18, 2020

Related U.S. Application Data

(63) Continuation of application No. PCT/JP2018/019386, filed on May 18, 2018.

(30) Foreign Application Priority Data

Jun. 28, 2017 (JP) .............................. JP2017-126726
Apr. 23, 2018 (JP) .............................. JP2018-082504

(51) Int. Cl.
*B60K 17/24* (2006.01)
*B60K 25/06* (2006.01)
(Continued)

(52) U.S. Cl.
CPC .............. *B60K 17/24* (2013.01); *B60K 25/06* (2013.01); *E02F 9/202* (2013.01);
(Continued)

(58) Field of Classification Search
CPC .. B60K 17/24; B60K 25/06; B60K 2025/005; B60K 2025/022; E02F 9/202; B60W 30/1888
See application file for complete search history.

(56) References Cited

U.S. PATENT DOCUMENTS 9,290,093 B2 * 3/2016 Turner ..................... B60K 1/04
9,985,499 B2 * 5/2018 Boehm ..................... H02P 9/00
(Continued)

FOREIGN PATENT DOCUMENTS

DE          103 03 050 A1     8/2004
DE          10303050 A1 *     8/2004     ............. B60K 25/06
(Continued)

OTHER PUBLICATIONS

Extended European Search Report issued in the corresponding European Patent Application No. 18823458.7 dated Feb. 24, 2021.
(Continued)

*Primary Examiner* — Jacob B Meyer
(74) *Attorney, Agent, or Firm* — Greenblum & Bernstein, P.L.C.

(57) ABSTRACT

An attachment structure of a generator and a working machine including a transmission case; and a PTO shaft protruding from the transmission case, includes a structure body attached to a side of the transmission case from which the PTO shaft protrudes, and includes the generator attached to the structure body.

8 Claims, 7 Drawing Sheets

(51) Int. Cl.
*E02F 9/20* (2006.01)
*B60K 25/00* (2006.01)
*B60K 25/02* (2006.01)
*B60W 30/188* (2012.01)

(52) U.S. Cl.
CPC .. *B60K 2025/005* (2013.01); *B60K 2025/022* (2013.01); *B60W 30/1888* (2013.01)

(56) References Cited

U.S. PATENT DOCUMENTS

| | | | | |
|---|---|---|---|---|
| 10,549,634 | B1* | 2/2020 | Vittatoe | F04C 29/04 |
| 10,582,657 | B2* | 3/2020 | Yagyu | A01C 17/005 |
| 11,273,834 | B2* | 3/2022 | Yagyu | B60K 17/28 |
| 2004/0150228 | A1* | 8/2004 | Kropp | B60K 25/06 |
| | | | | 290/1 C |
| 2015/0135863 | A1* | 5/2015 | Dalum | B60K 6/00 |
| | | | | 180/65.21 |
| 2015/0183436 | A1* | 7/2015 | Rekow | B60K 6/44 |
| | | | | 477/6 |
| 2015/0210151 | A1* | 7/2015 | Husson | B60W 20/00 |
| | | | | 903/903 |
| 2015/0367728 | A1* | 12/2015 | Neumann | F16D 21/04 |
| | | | | 74/15.6 |
| 2016/0053782 | A1* | 2/2016 | Fliearman | B60K 25/02 |
| | | | | 60/413 |
| 2018/0022337 | A1* | 1/2018 | Burjes | B60W 30/1888 |
| | | | | 477/4 |
| 2019/0140474 | A1* | 5/2019 | Stoltz | H02J 7/1423 |
| 2020/0114749 | A1* | 4/2020 | Kreis | B60K 17/28 |
| 2020/0122574 | A1* | 4/2020 | Hingne | A01B 71/06 |
| 2020/0130693 | A1* | 4/2020 | Yagyu | A01C 17/008 |
| 2020/0254865 | A1* | 8/2020 | Stoltz | B60K 6/40 |

FOREIGN PATENT DOCUMENTS

| | | | |
|---|---|---|---|
| DE | 20 2011 051 915 U1 | 11/2011 | |
| DE | 202011051914 U1 * | 1/2012 | B60K 25/06 |
| DE | 202011051915 U1 * | 1/2012 | H02K 7/1861 |
| DE | 10 2011 078 192 A1 | 1/2013 | |
| DE | 102011078192 A1 * | 1/2013 | B60K 25/06 |
| DE | 102012005299 A1 * | 9/2013 | B60K 17/28 |
| DE | 102012006731 A1 * | 10/2013 | B60K 17/28 |
| EP | 3098106 A1 | 11/2016 | |
| JP | S55147121 U | 10/1980 | |
| JP | S609043 Y2 | 4/1985 | |
| JP | H10290612 A | 11/1998 | |
| JP | H10313621 A | 12/1998 | |
| JP | 2002087086 A | 3/2002 | |
| JP | 2011245906 A | 12/2011 | |
| WO | WO-2013000606 A2 * | 1/2013 | B60K 25/06 |
| WO | WO-2019208816 A1 * | 10/2019 | A01B 71/06 |

OTHER PUBLICATIONS

International Search Report issued in International Patent Application No. PCT/JP2018/019386, dated Aug. 21, 2018.

* cited by examiner

ATTACHMENT STRUCTURE OF GENERATOR AND WORKING MACHINE

CROSS-REFERENCE TO RELATED APPLICATIONS

The present application is a continuation application of International Application No. PCT/JP2018/019386, filed May 18, 2018, which claims priority to Japanese Patent Application No. 2017/126726, filed Jun. 28, 2017, and to Japanese Patent Application No. 2018/082504, filed Apr. 23, 2018. The contents of these applications are incorporated herein by reference in their entirety.

BACKGROUND OF THE INVENTION

Field of the Invention

The present invention relates to an attachment structure of a generator for a traveling vehicle and to a working machine.

Description of Related Art

A working machine disclosed in Japanese Unexamined Patent Application Publication No. 2011-245906 is previously known.

The working machine (a tractor) disclosed in Japanese Unexamined Patent Application Publication No. 2011-245906 includes a vehicle body, an engine, a generator, an electric motor, and a traveling device. The working machine is configured to drive the traveling device with the power from the engine and the power from the generator (a driving force of the electric motor).

SUMMARY OF THE INVENTION

An attachment structure of a generator for a traveling vehicle according to one aspect of the present invention, including: a transmission case; and a PTO shaft protruding from the transmission case, includes: a structure body attached to a side of the transmission case from which the PTO shaft protrudes; and the generator attached to the structure body.

A working machine according to one aspect of the present invention, includes: a traveling vehicle has: a transmission case; and a PTO shaft protruding from the transmission case; a structure body attached to a side of the transmission case from which the PTO shaft protrudes; and the generator attached to the structure body.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
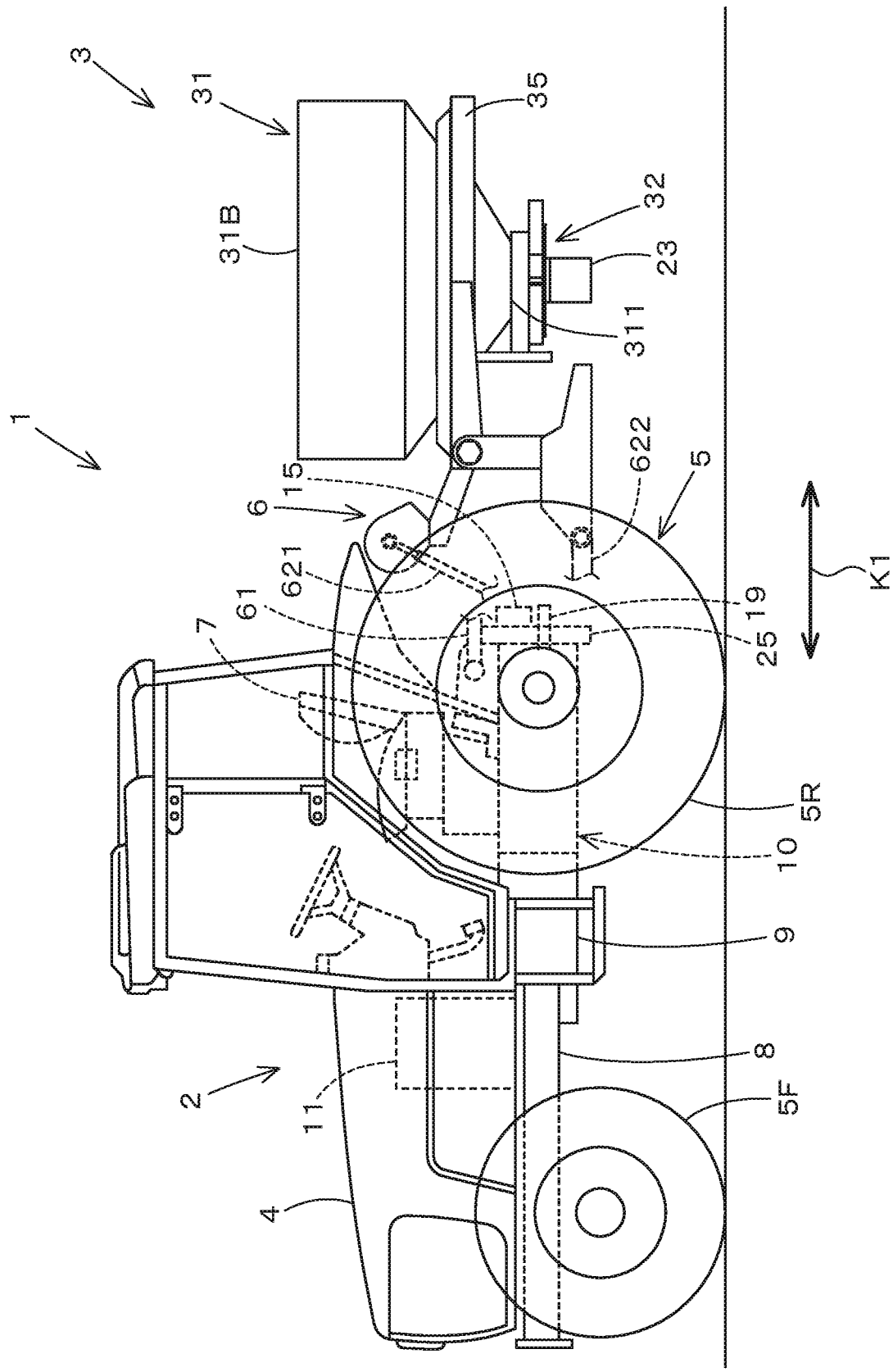
FIG. 1 is a side view illustrating a whole configuration of a working machine according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings.

First, the working machine 1 employed in the work management system and the work management method according to the present invention will be described below.

Figure 2:
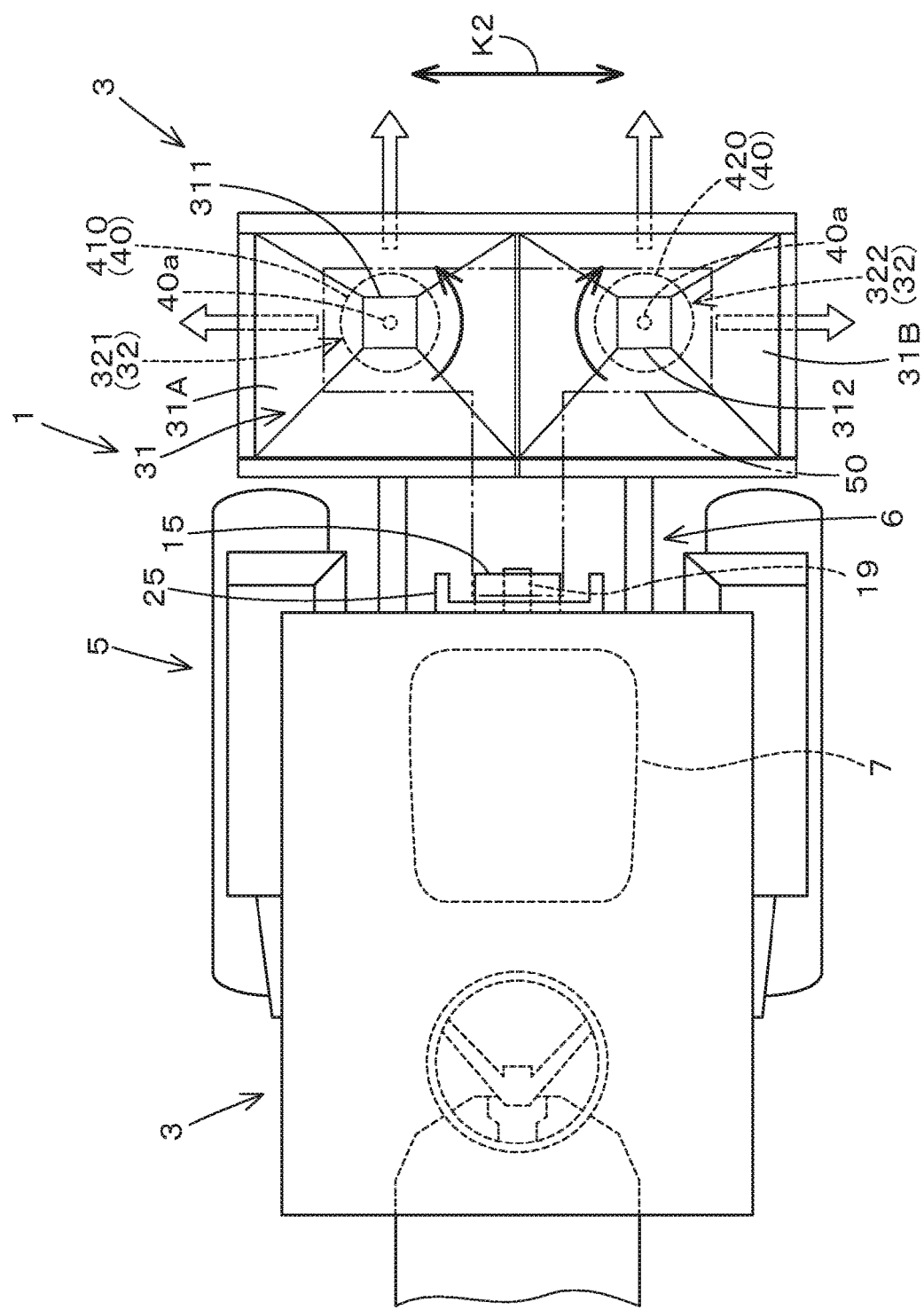
FIG. 2 is a planar view illustrating a rear portion of the working machine according to the embodiment.

FIG. 1 shows a side view of the entire working machine 1, and FIG. 2 shows a planar view of the rear portion of the working machine 1.

The work machine 1 includes a traveling vehicle 2 and a working device 3.

The traveling vehicle 2 is a vehicle configured to travel while towing the working device 3. In the case of this embodiment, since the traveling vehicle 2 is a tractor, the traveling vehicle 2 will be described as the tractor 2 below. However, the traveling vehicle 2 is not limited to a tractor, and may be an agricultural vehicle such as a combine or a rice transplanter, or may be a construction vehicle. The traveling vehicle 2 may be a pickup truck. In addition, the working device 3 may be configured to travel independently without being pulled by the traveling vehicle 2.

First, the overall configuration of the tractor (the traveling vehicle) 2 will be described.

The tractor 2 includes a vehicle body 4, a traveling device 5, and a coupling device 6. In the embodiment of the present invention, the front side of an operator seated on the operator seat 7 mounted on the vehicle body 4 (the left side in FIG. 1) is referred to as the front, the rear side of the operator (the right side in FIG. 1) is referred to as the rear, the left side of the operator (a front surface side of FIG. 1) is referred to as the left, and the right side of the operator (a back surface side of FIG. 1) is referred to as the right. In addition, the horizontal direction K2 (see FIG. 2), which is a direction orthogonal to the front-rear direction K1 (see FIG. 1), will be described as the vehicle width direction.

The vehicle body 4 includes a vehicle body frame 8, a clutch housing 9, and a transmission case 10. The vehicle body frame 5 extends in the front-rear direction of the vehicle body 4. An internal combustion engine 11 is mounted on the body frame 5. In the case of this embodiment, the internal combustion engine 11 is the engine 11, and more specifically a diesel engine. The engine 11 is mounted on the vehicle body frame 5 and arranged at the front portion of the vehicle body 4. The clutch housing 9 is connected to the rear portion of the engine 11 and houses the clutch. The transmission case 10 is connected to the rear portion of the clutch housing 9 and extends rearward. The transmission case 10 houses a speed-shifting device 13 and a rear wheel differential device 14 which will be described later. A generator 15 is attached to the rear portion of the transmission case 10 through a structure body 25 described later.

The traveling device 5 includes a front wheel SF provided at the front portion of the vehicle body 4 and includes a rear wheel 5R provided at the rear portion of the vehicle body 4. The front wheel SF is supported by the vehicle body frame 8. The rear wheel 5R is supported on the output shaft of the rear wheel differential device 14. The traveling device 5 is a tire type in this embodiment, but may be a crawler type.

The coupling device 6 is a device configured to connect, to the rear portion of the tractor 2, the working device 3 that performs the working on a farm field or the like. In the case of this embodiment, the coupling device 6 includes a three-point linkage mechanism. A specific configuration of the coupling device 6 according to the present embodiment will be described later. However, the configuration of the coupling device 6 is not particularly limited as long as the configuration can connect the working device 3 to the rear portion of the traveling vehicle 2. For example, when the traveling vehicle 2 is the pickup truck, the coupling device 6 couples the working device 3 with a mechanism other than the three-point linkage mechanism.

The type of the working device 3 coupled to the coupling device 6 is not particularly limited. For example, a spreader device that spreads a spread substance such as the fertilizer or the chemicals, a sowing device that disperses seeds such as crops, a tilling device that performs the plowing, a harvesting device that performs the harvesting, a mower device for cutting grass, a tedder device for diffusing the grass, a raking device for collecting the grass, a bailer device for shaping the grass, and the like. FIG. 1 and FIG. 2 show an example in which the spreader device is attached as the working device 3.

The tractor 2 includes a PTO shaft 19 for transmitting power from the engine 11 that drives the tractor 2 to the working device or the like. The PTO shaft 19 protrudes rearward from the transmission case 10.

Figure 3:
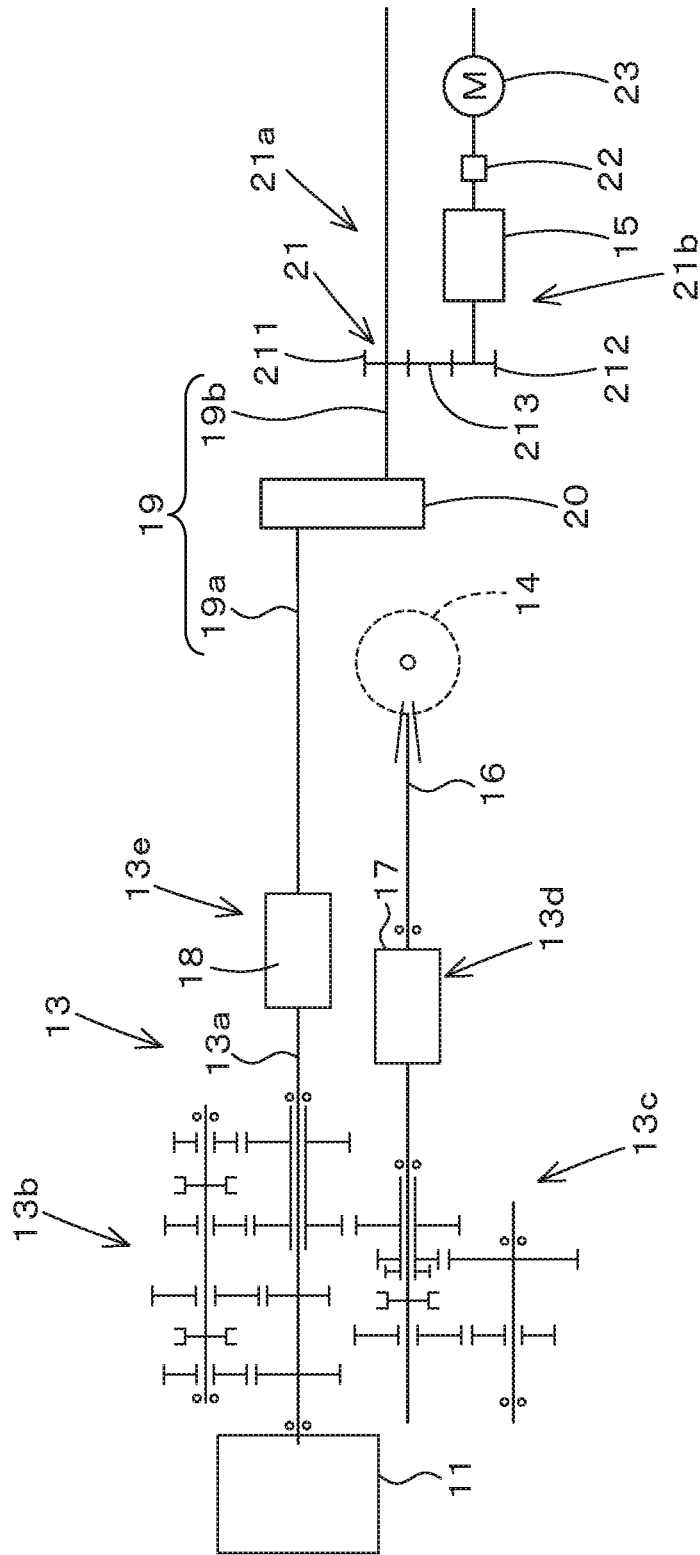
FIG. 3 is a view illustrating a power transmission system of an engine and a transmission device according to the embodiment.

FIG. 3 shows a power transmission system of the engine 11 and the transmission device 13.

As shown in FIG. 3, the transmission device 13 includes a main shaft (a thrust shaft) 13a, a main transmission portion 13b, and a sub-transmission portion 13c. The thrust shaft 13a is rotatably supported by the housing case of the transmission device 13, and power from the crankshaft of the engine 11 is transmitted to the thrust shaft 13a. The main transmission portion 13b includes a plurality of gears and a shifter that changes connection between the gears. The main transmission portion 13b changes and outputs (shifts) the rotating speed inputted from the thrust shaft 13a by appropriately changing the connection (engagement) between the plurality of gears with a shifter.

Similar to the main transmission portion 13b, the auxiliary transmission portion 13c includes a plurality of gears and a shifter that changes connection between the gears. The auxiliary transmission portion 13c changes and outputs (shifts) the rotating speed inputted from the main transmission portion 13b by appropriately changing the connection (engagement) between the plurality of gears with a shifter.

The transmission device 13 includes a shuttle portion 13d. The shuttle portion 13d includes a shuttle shaft 16 and a forward/reverse switch portion 17. The power outputted from the auxiliary transmission portion 5c is transmitted to the shuttle shaft 16 through the gear or the like. The rear wheel differential device 14 is provided on the shuttle shaft 16. A rear axle that supports the rear wheel is rotatably supported by the rear wheel differential device 14. The forward/reverse switch portion 13 is constituted of, for example, a clutch such as a hydraulic clutch or an electric clutch, and turns on and off the clutch to switch the rotation direction of the shuttle shaft 16, that is, forward traveling and reverse traveling of the tractor 2.

The PTO power transmission portion 13e has the PTO clutch 18 and the PTO shaft 19. The PTO shaft 19 is rotatably supported and can transmit the power from the thrust shaft 13a. The PTO shaft 19 has a PTO thrust shaft 19a and a PTO output shaft 19b. The PTO thrust shaft 19a is connected to the PTO output shaft 19b through the PTO speed-changer portion 20.

The PTO speed-changer portion 20 is configured to change the rotating speed of the PTO thrust shaft 19a and transmit the rotating speed to the PTO output shaft 19b with an operation portion such as a PTO transmission lever. The PTO speed-changer portion 20 includes a speed-changing actuator such as an electromagnetic solenoid or an electric motor that can operate the operation portion based on a control signal from the controller portion 83 described later.

The PTO clutch 18 is a clutch that can be switched between a connected state in which the power of the thrust shaft 13a is transmitted to the PTO shaft 19 and a disconnected state in which the power of the thrust shaft 13a is not transmitted to the PTO shaft 19. In particular, the PTO clutch 18 is arranged between the thrust shaft 13a and the PTO thrust shaft 19a. The PTO clutch 18 is constituted of a hydraulic clutch, an electric clutch, or the like, and is switched between a state where the power of the engine 11 (the power of the thrust shaft 13a) is transmitted to the PTO shaft 19 when the clutch is turned on and off and a state where the power of the thrust shaft 13a is not transmitted to the PTO shaft 19 when the clutch is turned on and off.

A power dividing portion 21 is provided in the middle of the PTO output shaft 19b. The power dividing portion 21 divides the rotating power transmitted to the PTO output shaft 19b to a first path 21a for outputting the rotating power from the PTO output shaft 19b directly and a second path 21b for transmitting to the generator 15. The power dividing portion 21 is constituted of, for example, the first pulley 211 attached to the PTO output shaft 19b, the second pulley 212 attached to the input shaft of the generator 15, and the belt 213 configured to transmit the rotating power from the first pulley 211 to the second pulley 212. However, the configuration of the power dividing portion 21 is not limited to the configuration using the pulley and the belt, and may be another configuration (for example, a configuration using a gear transmission mechanism or another power transmission mechanism).

In this manner, the rotating power of the PTO output shaft 19b is divided into two by the power dividing portion 21, one is outputted directly from the PTO output shaft 19b, and the other is transmitted to the input shaft of the generator 15, and thereby activating the generator 15.

The generator 15 is connected to a motor 23 through an inverter 22. The motor 23 is an electric motor, and is driven (rotated) by the power (the electric power) from the generator 15. The inverter 22 serves as a transmission device that changes the rotating speed (the number of revolving) of the motor 23. The number of motors 23 to be driven by the power from the generator 15 may be one, two or more.

In this embodiment, the generator 15 is an alternator. However, the generator 15 may be a motor generator. The generator 15 preferably has an output voltage of 60V or less. By employing the generator 15 having the output voltage of 60V or less, the power consumption can be reduced, and the excellent safety is provided. Thus, the working device 3 capable of operating at a low voltage of 60V or less is preferably employed. In particular, a spreader device or a seeding device is preferably employed as the working device 3. In the case of this embodiment, since the working device 3 is the spreader device, the following description will be made assuming that the working device 3 is the spreader device 3.

Next, the attachment structure of the generator 15 is described.

Figure 4:
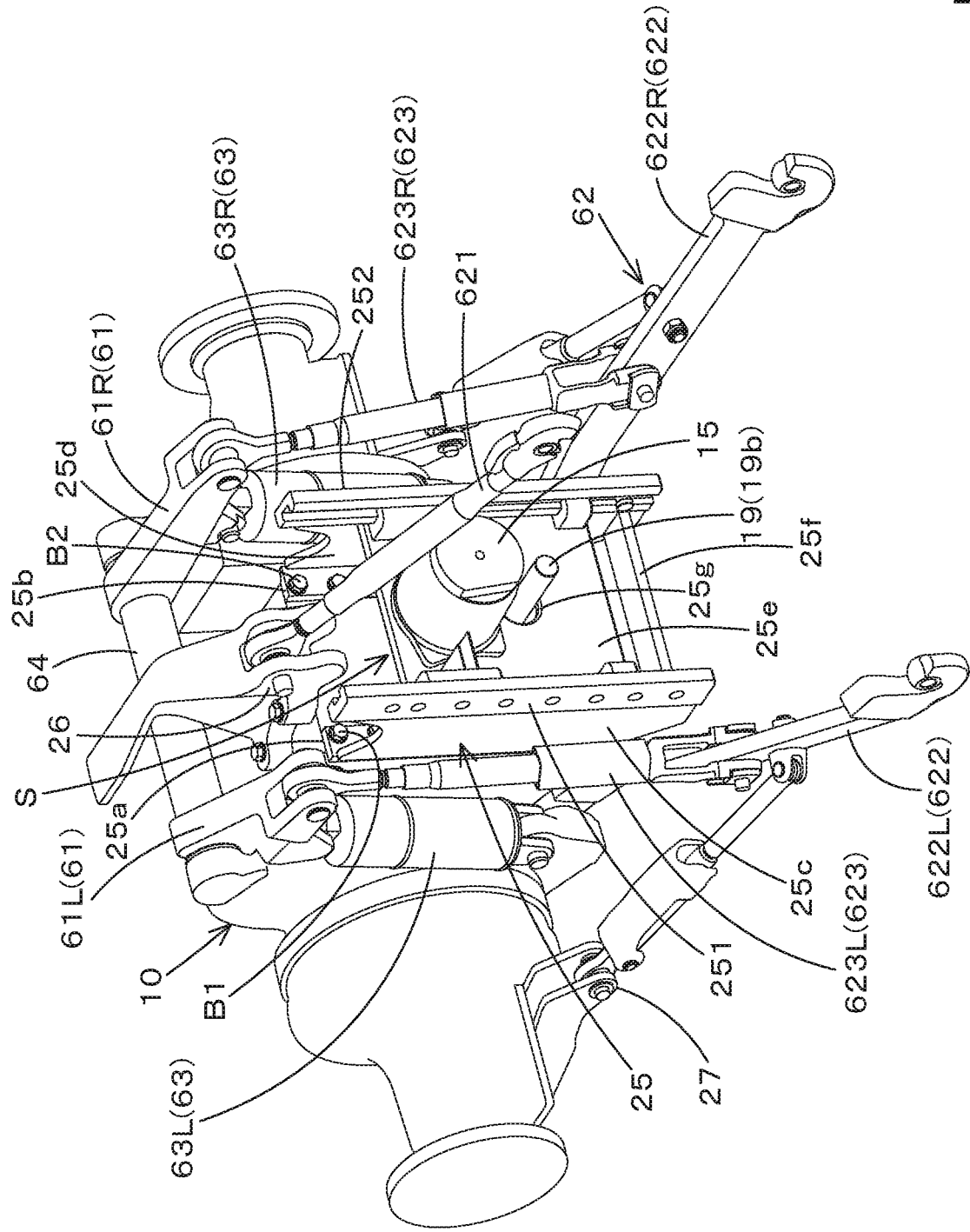
FIG. 4 is a perspective view illustrating an attachment state of a generator to a transmission case according to the embodiment.

As shown in FIG. 4, a structure body 25 is provided at the rear portion of the transmission case 10, and the generator 15 is mounted on the structure body 25.

In the case of the present embodiment, the structure body 25 is a coupling device configured to be connected to the working device 3 or the like that is driven by the power transmitted from the PTO shaft 19 (the PTO output shaft 19b), and is specifically a ladder hitch. The structure body 25 constitutes a coupling device different from the coupling device 6 including the three-point linkage mechanism.

The structure body 25 is detachably attached to the rear surface of the transmission case 10. The structure body 25 includes a first front plate 25a, a second front plate 25b, a first side plate 25c, a second side plate 25d, a rear plate 25e, and a lower plate 25f.

The first front plate 25a and the second front plate 25b are arranged at an interval (arranged separately) in the vehicle width direction, and extend in the vertical direction. The first front plate 25a is arranged on one side (the left side) in the vehicle width direction, and is attached to the left portion of the rear surface of the transmission case 10 with a bolt B1. The second front plate 25b is arranged on one side (the right side) in the vehicle width direction, and is attached to the right portion of the rear surface of the transmission case 10 with a bolt B2. That is, the first front plate 25a and the second front plate 25b constitute a first portion that is attached to the transmission case 10.

The first side plate 25c has a front end portion connected to the first front plate 25a, and extends backward (in a direction separating away from the transmission case 10). The second side plate 25d has a front end portion connected to the second front plate 25b, and extends rearward. The lower plate 25f extends in the vehicle width direction, and connects between the lower portion of the first side plate 25c and the lower portion of the second side plate 25d. A drawbar (a towing hitch) or the like can be attached to the lower plate 25f.

A first attachment portion 251 is provided at the rear portion of the first side plate 25c. A second attachment portion 252 is provided at the rear portion of the second side plate 25d. A plurality of through holes are formed in the first attachment portion 251 and the second attachment portion 252 at intervals in the vertical direction. The through-holes can be used in order to connect the working device 3 or the like. That is, the working device 3 and the like can be coupled to the first attachment portion 251 and the second attachment portion 252 of the structure body 25. In other words, the first attachment portion 251 and the second attachment portion 252 constitute a second portion to which the working device 3 can be attached.

The rear plate 25e is a rectangular plate, and is attached so as to communicate between the first attachment portion 251 and the second attachment portion 252. A through hole 25g is formed in the rear plate 25e, and the PTO shaft 19 (the PTO output shaft 19b) protrudes rearward from the through hole 25g. A space S is formed between the rear plate 25e and the rear surface of the transmission case 10, and the power dividing portion 21 can be arranged in the space S. The generator 15 is attached to the rear surface of the rear plate 25e by a fixing tool such as a bolt. That is, the rear plate 25e forms a third portion in which a through hole 25g for projecting the PTO shaft 19 is formed and on which the generator 15 is mounted under the state where the first portion is attached to the transmission case 10. The generator 15 is arranged above the PTO shaft 19. The generator 15 is arranged between the first attachment portion 251 and the second attachment portion 252.

The structure body 25 can be easily attached to and detached from the transmission case 10 by attaching and detaching the bolts B1 and B2. By attaching/detaching the structure body 25 to/from the transmission case 10, the generator 15 can be attached to and detached from the transmission case 10. Thus, the generator 15 can be easily attached as necessary to the tractor 2 that does not include the generator 15.

The structure body 25 just needs to have a structure for attaching the generator 15 to the transmission case 10, and is not limited to a coupling device (the ladder hitch or the like) capable of coupling the working device 3 or the like. For example, the structure body 25 may be a jig or a bracket dedicated for attaching the generator 15 to the transmission case 10.

As shown in FIG. 4, the coupling device 6 is connected to the transmission case 10. The coupling device 6 includes the lift arm 61, the three-point linkage mechanism 62, and the shift cylinder 63.

The lift arm 61 includes the first lift arm 61L and the second lift arm 61R. The first lift arm 61L is arranged to one side (to the left) in the vehicle width direction. The second lift arm 61R is arranged to the other side (to the right) in the vehicle width direction. The front ends of the first lift arm 61L and the second lift arm 61R are pivotally supported by a horizontal shaft 64 that is supported by the upper portion of the transmission case 10, and extend backward.

The three-point linkage mechanism 62 includes the top linkage 621, the lower linkage 622, and the lift rod 623. The top linkage 621 is arranged between the first lift arm 61L and the second lift arm 61R, and the front end portion is pivotally supported by the first pivotal support portion 26 that is provided at the upper portion of the transmission case 10. The lower linkage 622 includes the first lower linkage 622L and the second lower linkage 6226R. The front end portions of the first lower linkage 622L and the second lower linkage 6226R are pivotally supported by the second pivotal support portion 27 that is provided at the lower portion of the transmission case 10. The lift rod 623 includes the first lift rod 623L and the second lift rod 623R. The first lift rod 623L has an upper end portion connected to the rear end portion of the first lift arm 61L, and the lower end portion is connected to a middle portion of the first lower linkage 622L in the longitudinal direction. The upper end portion of the second lift rod 623R is connected to the rear end portion of the second lift arm 61R, and the lower end portion is connected to the middle portion of the second lower linkage 622R in the longitudinal direction.

A joint capable of connecting the working device 3 is provided at the rear end portion of the top linkage 621 and the rear end portion of the lower linkage 622. By connecting the working device 3 to the rear end portion of the top linkage 621 and the rear end portion of the lower linkage 622, the working device 3 is connected to the rear portion of the tractor 2 so as to be movable up and down.

The lift cylinder 63 is a hydraulic cylinder, and includes a first lift cylinder 63L and a second lift cylinder 63R. The first lift cylinder 63L has one end portion connected to the first lift arm 61L and has the other end portion connected to the lower left portion of the transmission case 10. The second lift cylinder 63R has one end portion connected to the second lift arm 61R and has the other end portion connected to the lower right portion of the transmission case 10. By driving the lift cylinder 63, the first lift arm 61L and the second lift arm 61R rotate about the horizontal axis 64 and swing vertically. An electromagnetic control valve is connected to the first lift cylinder 63L and the second lift cylinder 63R. The electromagnetic control valve can drive the first lift cylinder 63L and the second lift cylinder 63R based on a control signal outputted from the controller portion 83 described later.

By driving the lift cylinder 63, the height of the working device 3 and the inclination in the vehicle width direction (the difference between the height of the right portion and the height of the left portion) can be adjusted. In adjusting the height, both the first lift cylinder 63L and the second lift cylinder 63R are driven in the same manner. In adjusting the inclination, either the first lift cylinder 63L or the second lift cylinder 63R is driven. In particular, the first lift cylinder 63L or the second lift cylinder 63R is driven so that the lift cylinder arranged on the lower side of the working device 3 is extended or the lift cylinder arranged on the higher side is shortened. The lift cylinder 63 constitutes a height adjuster mechanism 91 and a height adjuster mechanism described later.

As shown in FIG. 1 and FIG. 2, the spreader device 3 includes the container portion 31 and the spreader portion 32.

The container portion 31 contains the spread substance (the fertilizer, the agrochemicals, and the like) to be spread on a farm field.

The container portion 31 is constituted of the substantially inverted pyramid-shaped hopper. The hopper includes a first hopper 31A and a second hopper 31B. However, the number of hoppers is not limited. The container portion 31 has a charging inlet for the spread substance at the upper end portion, and has a take-out outlet for taking out the spread substance at the lower end portion. Although the number of the take-out outlets is not limited, in the case of this embodiment, it is set according to the number of rotors (the disks) 40 to be described later. In particular, the number of rotors 40 is two, and the number of outlets is two.

Figure 5:
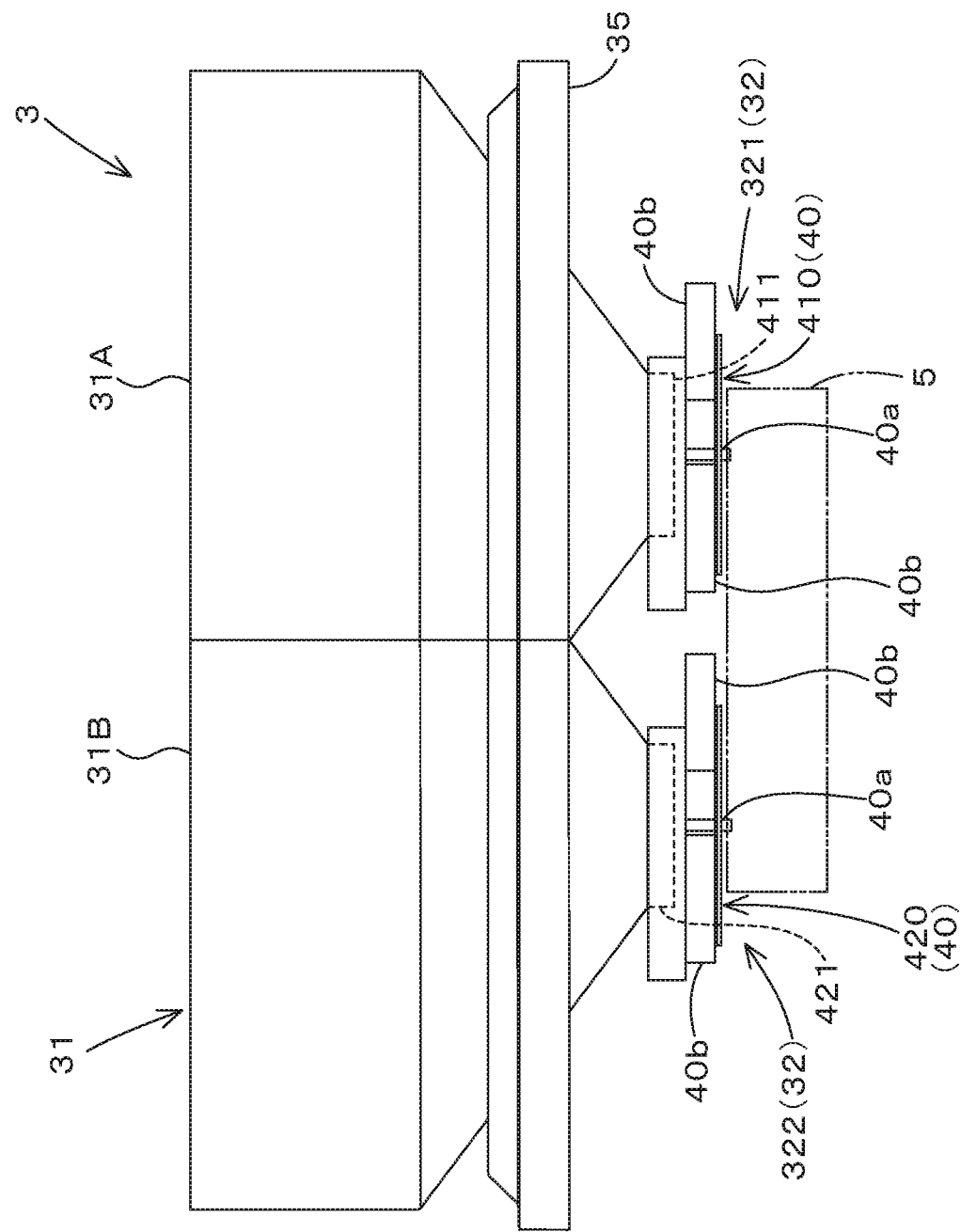
FIG. 5 is a back view of a spreader device according to the embodiment.

The spreader portion 32 spreads the spread substance contained in the container portion 31. As shown in FIG. 1 and FIG. 5, the spreader portion 32 is provided below the container portion 31. The spreader portion 32 includes at least two or more spreader portions. At least two or more spreader portions preferably have different spreading directions in all the spreader portions, but may include the spreader portions having the same spreading direction.

Figure 6:
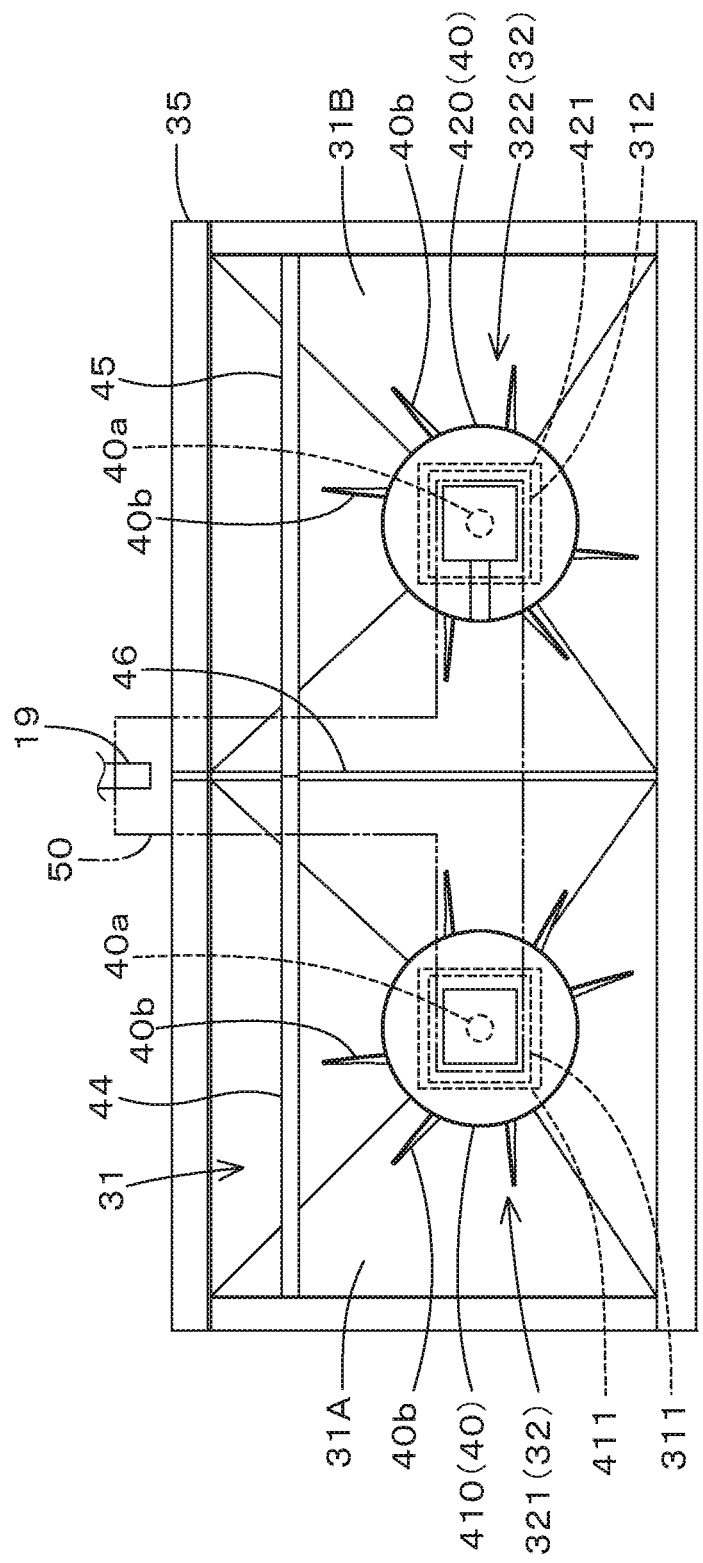
FIG. 6 is a bottom view of the spreader device according to the embodiment.

As shown in FIG. 2, FIG. 5, and FIG. 6, the spreader portion 32 includes the first spreader portion 321 and the second spreader portion 322. That is, in the case of this embodiment, the number of the spreader portions 32 is two. However, the number of spreader portions 32 is not limited to two, and may be three or more. The number of the spreader portions 32 and the number of the rotors 40 are the same. The first spreader portion 321 and the second spreader portion 322 are arranged side by side in the vehicle width direction. Hereinafter, the two spreader portions (the first spreader portion 321 and the second spreader portion 322) will be described below.

As shown in FIG. 5 and FIG. 6, the first spreader portion 321 includes a first rotor 410 and a first shutter device 411.

The first rotor 410 has a disk shape, and is configured to rotate around a center axis 40a extending in the perpendicular direction (in the vertical direction). A plurality of blade members 40b are attached to the upper surface of the first rotor 410. The plurality of blade members 40b are arranged at intervals in the circumferential direction, and are extended in the radial direction from the vicinity of the center axis 40a. By rotating around the center axis 40a, the first rotor 410 spreads the spread substance that has fallen from the first take-out outlet 71 radially onto the blade member 40b toward the outside (radially outward direction).

The first shutter device 411 includes a shutter and an electric motor (not shown n the drawings). The shutter is attached to one take-out outlet (a first take-out outlet) 311 of the container portion 31, and is configured to move to change the area (an opening aperture) of the first take-out outlet 311. The electric motor is a stepping motor or the like, and is coupled to the shutter. The first shutter device 411 moves the shutter to change the opening aperture of the first take-out outlet 71 by driving the electric motor. In this manner, the spreading amount of the spread substance by the first spreader portion 321 is adjusted.

As shown in FIG. 5 and FIG. 6, the second spreader portion 322 includes the second rotor 420 and the second shutter device 421. Since the configuration of the second rotary body 420 is the same as that of the first rotary body 410, the description is omitted. The configuration of the second shutter device 421 is the same as that of the first shutter device except that the shutter is attached to the other take-out outlet (a second take-out outlet) 312 of the container portion 31. The second shutter device 421 is capable of changing the opening aperture of the second take-out outlet 312 to adjust the spreading amount of the spread substance by the second spreader portion 322.

As shown in FIGS. 2 and 6, the first rotor 410 and the second rotor 420 are provided side by side in the vehicle width direction. As shown in FIG. 2, the first rotor 410 and the second rotor 420 rotate in different directions. In the case of the present embodiment, as indicated by the black arrow in FIG. 2, the first rotor 410 rotates counterclockwise and the second rotor 420 rotates clockwise in planar view.

The first rotor 410 is arranged below the first take-out outlet 311 of the container portion 31. The spread substance that has fallen from the first take-out outlet 311 is spread by the rotating first rotor 410. The second rotor 420 is arranged below the second take-out outlet 312 of the container portion 31. The spread substance that has fallen from the second take-out outlet 312 is spread by the rotating second rotor 420.

In the case of this embodiment, the spreading directions of the first spreader portion 321 and the second spreader portion 322 are different from each other. The spreading direction of the first spreader portion 321 is one side and the rear side in the vehicle width direction. The spreading direction of the second spreader portion 322 is the other side and the rear side in the vehicle width direction. As shown by the white arrowed line in FIG. 2, in the present embodiment, the spreading direction of the first spreader portion 321 is the right and the right rear, and the spreading direction of the second spreader portion 322 is the left and the left rear. In addition, the direction shown by the white arrowed line is a main spreading direction, and the spreading direction actually spreads in the fan shape including the direction shown by the white arrowed lines.

As shown in FIG. 6, the spreader portion 32 has a restrictor plate that restricts the spreading directions of the first spreader portion 321 and the second spreader portion 322. The restrictor plate includes a first restrictor plate 44, a second restrictor plate 45, and a third restrictor plate 46.

Each of the restrictor plate can be attached to the frame 35 or the like described later. The first restrictor plate 44 is provided in front of the first rotor 410 and extends in the vehicle width direction. The second restrictor plate 45 is provided in front of the second rotor 420 and extends in the vehicle width direction. The third restrictor plate 46 is provided between the first rotor 410 and the second rotor 420 and extends in the front-rear direction.

The spreading direction by the rotating of the first rotor 410 is regulated by the first restrictor plate 44 and the third restrictor plate 46, and is mainly restricted to the right and to the right rear. The spreading direction by the rotating of the second rotor 420 is regulated by the second restrictor plate 45 and the third restrictor plate 46, and is mainly restricted to the left and to the left rear. However, any configuration (the position, the number, the shape, the attachment structure, and the like) can be employed as long as the restrictor plate can regulate the spreading direction of the first spreader portion 321 and the second spreader portion 322 to a desired direction. In addition, the configuration which does not provide all of or a part of the restrictor plates also may be employed.

In the case of the present embodiment, the first spreader portion 321 and the second spreader portion 322 are each responsible for spreading in different directions. In this manner, uniform spreading to a farm field can be performed easily. In addition, by differentiating the rotating speed of the first rotor 410 from the rotating speed of the second rotor 420, the spreading distance to one side of the tractor 2 in the vehicle width direction can be differentiated from the spreading distance to the other side. Thereby, appropriate spreading according to the shape of the agricultural field and the traveling position of the tractor 2 is facilitated.

The spreader device 3 includes a frame (an attachment portion) 35. The frame 35 supports the container portion 31, the spreader portion 32, and the motor 23. As shown in FIG. 1 and FIG. 2, the front portion of the frame 35 is connected to a coupling device 6 provided at the rear portion of the tractor 2. In this manner, the spreader device 3 supported by the frame 35 is detachably attached to the rear portion of the tractor 2. The configuration (the shape and the like) of the frame 35 is not limited to the illustrated configuration.

As shown in FIG. 1, FIG. 5 to FIG. 7, the spreader device 3 includes a power transmission mechanism 50. The power transmission mechanism 50 is a mechanism configured to transmit the power from the motor 23 and the power from the PTO shaft 19 to the first rotor 410 and the second rotor 420. The configuration of the power transmission mechanism 50 is not particularly limited, but the configuration may be provided with a selection transmission portion (an electric clutch or the like) configured to selectively transmit the power from the motor 23 and the power from the PTO shaft 19 to the first rotor 410 or the second rotor 420. In addition, as the power transmission mechanism 50 may be provided with a mechanism (a planetary gear mechanism or the like) to which the power from the motor 23 and the power from the PTO shaft 19 are inputted and provided with a dividing transmission portion configured to divide the power outputted from the motor 23 into two (one and the other) and transmit the divided powers to the first rotor 410 or the second rotor 420.

Next, the work management system 100 will be described. The work management system 100 is a system for managing the working executed by the working machine 1 described above.

Figure 7:
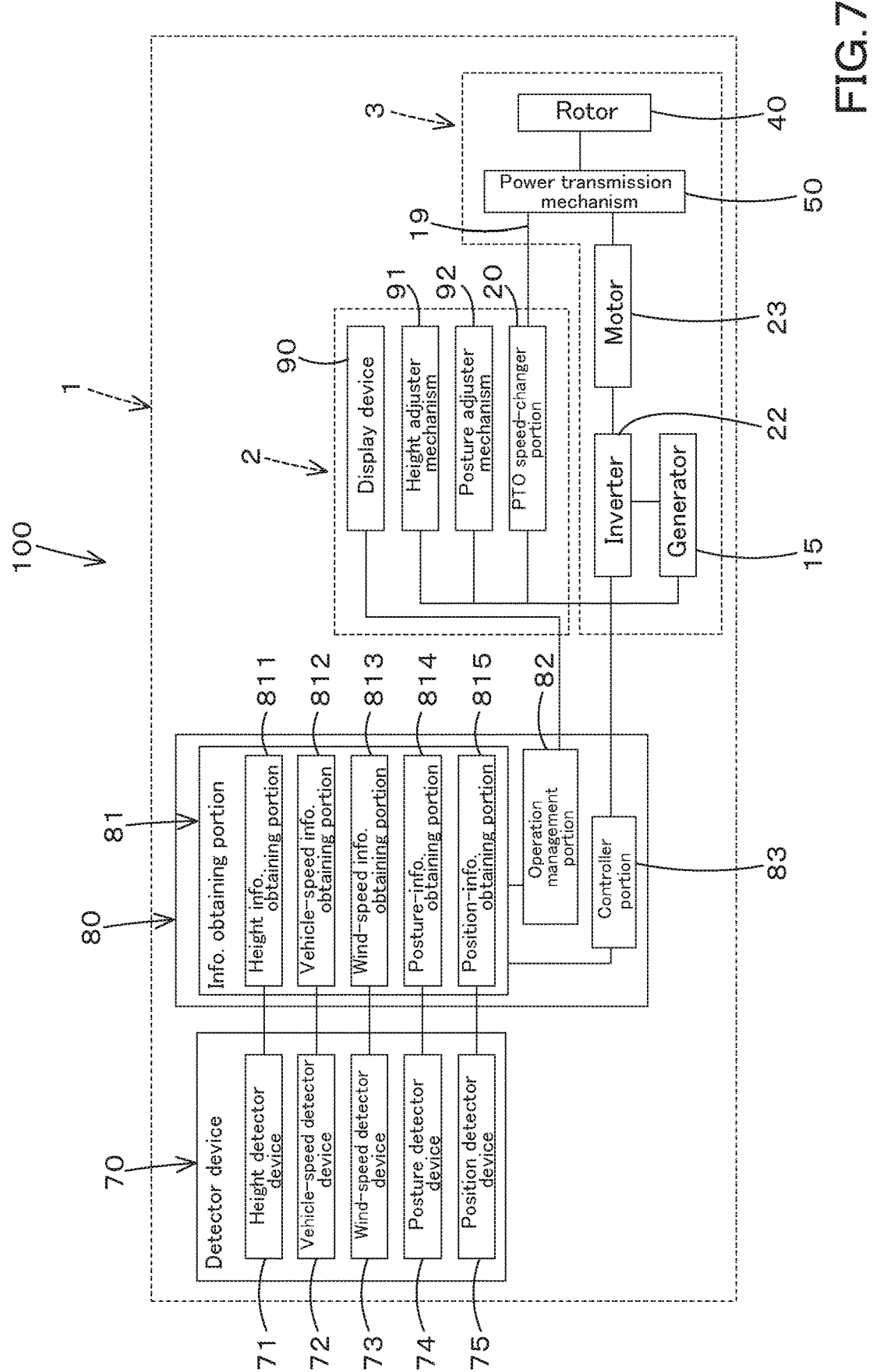
FIG. 7 is a block diagram of a work management system according to the embodiment.

As shown in FIG. 7, the work management system 100 includes the generator 15, the motor 23, a detector device 70, and the management device 80. Since the configurations of the generator 15 and the motor 23 are as described above, the description thereof is omitted.

The detector device 70 detects information related to the working device (the spreader device) 3 that is operated by the power from the generator 15. The detector device 70 includes the height detector device 71, the vehicle-speed detector device 72, the wind-speed detector device 73, the posture detector device 74, and the position detector device 75. The height detector device 71, the vehicle-speed detector device 72, the wind-speed detector device 73, the posture detector device 74, and the position detector device 75 are provided in the tractor 2 or the working device 3. The tractor 2 or the working device 3 may be provided with at least one of the height detector device 71, the vehicle-speed detector device 72, the wind-speed detector device 73, the posture detector device 74, and the position detector device 75.

The height detector device 71 is a height sensor configured to detect the height of the rotor (disk) 40 from the ground. As the height sensor, for example, an ultrasonic level sensor, a microwave level sensor, a laser level sensor, or the like can be employed. The height sensor may directly detect the height of the rotor, or may detect the height of a portion other than the rotor (for example, the frame 35, the coupling device 6, a part of the tractor 2, and the like) and then detect the height of the rotor indirectly based on the difference in height between the detected portion and the rotor. Thus, the height detector device 71 is preferably provided in the working device 3, but may be provided in the tractor 2.

The vehicle-speed detector device 72 is a speed sensor configured to detect the traveling speed (the vehicle speed) of the working machine 1. The speed sensor may detect the traveling speed of the tractor 2, or may detect the traveling speed (a moving speed) of the working device 3 pulled by the tractor 2. Thus, the vehicle-speed detector device 72 is preferably provided in the tractor 2, but may be provided in the working device 3. As the speed sensor, for example, a pickup type vehicle speed sensor configured to measure the traveling speed based on the rotating speed of the input shaft of the rear wheel differential device 14 can be employed, but the speed sensor is not limited thereto.

The wind-speed detector device 73 is a wind speed sensor configured to detect the speed (a wind speed) and direction of the wind received by the working device 3. The wind speed sensor may directly detect the speed and direction of the wind received by the working device 3, or may detect the speed and direction of the wind received by the tractor 2 and determine the detected speed and direction as the speed and direction of the working device 3. Thus, the wind-speed detector device 73 is preferably provided in the working device 3, but may be provided in the tractor 2.

The posture detector device 74 is a posture sensor configured to detect the posture of the working device 3. The posture sensor is, for example, an inclination sensor configured to detect the inclination of the working device 3. The inclination sensor detects the inclination of the working device 3 in the vehicle width direction (the difference in height between the left portion and the right portion). The inclination sensor may directly detect the inclination of the working device 3, or may detect the inclination of the tractor 2 to calculate the inclination of the working device 3 based on the inclination of the tractor 2. Thus, the wind-speed detector device 73 is preferably provided in the spreader device 3, but may be provided in the tractor 2.

The position detector device 75 is a positioning device configured to detect the position of the working device 3, and to detect the position of the working device 3 by receiving a satellite signal from a positioning satellite such as the GPS. The positioning device may directly detect the position of the working device 3, or may detect the position of the tractor 2 to calculate the position of the working device 3 based on the position of the tractor 2. Thus, the position detector device 75 is preferably provided in the working device 3, but may be provided in the tractor 2.

The management device 80 is constituted of a computer. The management device 80 may be provided in the tractor 2 or in the working device 3. In addition, the management device 80 may be provided in both the tractor 2 and the working device 3. When the management device 80 is provided in both the tractor 2 and the working device 3, a part of the configuration (the function) of the management device 80 is provided in the tractor 2, the remaining part is provided in the working device 3, and thereby providing a configuration to transmit and receive information to and from each other.

The management device 80 includes the information obtaining portion 81, the work management portion 82, and the controller portion 83. The information obtaining portion 81, the work management portion 82, and the controller portion 83 are constituted of an electronic/electrical component (a CPU, a memory, or the like), a computer program, or the like which is provided in the management device 80.

The information obtaining portion 81 obtains the operation information at the time of operation of the working device (the spreader device) 3 activated by power from the generator 15. The operation information includes, for example, the height information related to the height of the working device 3, the speed information related to the speed of the working machine 1, the posture information related to the posture of the working device 3, the position information related to the position of the working device 3, and the like. In addition, the information obtaining portion 81 can also obtain the wind speed information related to the speed (wind speed) and direction of the wind received by the working device 3. The operation information and the wind speed information (hereinafter collectively referred to as "operation information and the like") are detected by the detector device 70, and then is transmitted to the management device 80 via the bus. The information obtaining portion 81 of the management device 80 obtains the operation information and the like outputted from the detector device 70.

The information obtaining portion 81 includes the height information obtaining portion 811, the vehicle-speed information obtaining portion 812, the wind-speed information obtaining portion 813, the posture information obtaining portion 814, and the position information obtaining portion 815. The height information obtaining portion 811 obtains the height information detected by the height detector device 71. The vehicle-speed information obtaining portion 812 obtains the vehicle speed information detected by the vehicle-speed detector device 72. The wind-speed information obtaining portion 813 obtains the wind speed information detected by the wind-speed detector device 73. The posture information obtaining portion 814 obtains the posture information detected by the posture detector device 74. The position information obtaining portion 815 obtains the position information detected by the position detector device 75.

The work management portion 82 manages the working of the working device 3 based on the operation information obtained by the information obtaining portion 81. In particular, the work management portion 82 displays the operation information obtained by the information obtaining portion 81 on the display device 90. The display device 90 is constituted of a liquid crystal display or the like. For example, the display device 90 is provided in front of the operator seat 7 of the tractor 2, but may be provided in another position of the tractor 2 or may be provided in the working device 3. In addition, the display device 90 and the work management portion 82 may be integrated or may be separated. The operation information displayed on the display device 90 may be all of or a part of the operation information described above. In addition to the operation information and the like, information on the agricultural field in which the working machine 1 performs the working can be displayed on the display device 90. For example, the controller portion 83 is configured to display an image monitoring which position the working machine 1 is traveling in the farm field on the basis of the map information (information indicating the position of the farm field, the boundary line, and the like) stored in the memory of the management device 80 in advance on the display device 90 in a method such as displaying the working machine 1 on a map of the farm field.

The controller portion 83 controls the driving of the working device 3 based on the operation information obtained by the information obtaining portion 81. In particular, the controller portion 83 controls the rotating speed of the rotor (the disk) 40 based on the operation information obtained by the information obtaining portion 81. In more detail, the controller portion 83 controls the rotating speed of the rotor 40 based on at least one or more pieces of information among the operation information and the like (the height information, the vehicle speed information, the wind speed information, the posture information, the position information) which is obtained by the information obtaining portion. When the working device (the spreader device) 3 includes a plurality of rotors 40, the controller portion 83 may control the rotating speeds of the plurality of rotors 40 individually, or may control the rotating speeds of the plurality of rotors 40 in synchronization with each other. When individually controlling the rotating speeds of the plurality of rotors 40, the rotating speeds of the plurality of rotors 40 can be made different from each other, or the rotating speeds of the plurality of rotors 40 can all be the same.

The rotating speed of the rotor 40 can be controlled by controlling the rotating speed of at least one of the motor 23 and the PTO shaft 19. The controller portion 83 is configured to transmit a control signal to the inverter 22 to control the rotating speed of the motor 23. In addition, the controller portion 83 is configured to transmit a control signal to the PTO speed-changer portion 20 to shift the PTO shaft 19, thereby controlling the rotating speed of the rotor 40. That is, the controller portion 83 is capable of shifting the speed of the motor 23 to control the rotating speed of the rotor 40, and is also capable of shifting the speed of the PTO shaft 19 to control the rotating speed of the rotor 40. In addition, the controller portion 83 is also capable of performing the control to switch the PTO shaft 19 between the rotating and the stopped by switching the PTO clutch 15 between the connected state and the disconnected state.

Hereinafter, the control of the rotating speed of the rotor 40 by the controller portion 83 will be further described.

When the controller portion 83 controls the rotating speed of the rotor 40 based on the height information, the controller portion 83 controls the rotating speed of the rotor 40 so as to increase as the height of the rotor 40 from the ground decreases, for example. In this manner, it is prevented that the spreading distance of a spread substance decreases even when the height of the rotor 40 becomes low. That is, even when the height of the rotor 40 changes, the spreading distance of the spread substance can be made substantially constant.

When the controller portion 83 controls the rotating speed of the rotor 40 based on the vehicle speed information, for example, the controller portion 83 performs the control so as to increase the rotating speed of the rotor 40 as the vehicle speed increases. In this manner, when the speed of the tractor 2 is increased, it is possible to prevent the amount of spread substance per unit area from decreasing. That is, even when the speed of the tractor 2 changes, the amount of spread substance per unit area can be made substantially constant.

When the controller portion 83 controls the rotating speed of the rotor 40 based on the wind speed information, the controller portion 83 performs the control, for example, so as to increase the rotating speed of the rotor 40 as the speed of the winds in the direction opposite to the spreading direction of the rotor 40 increases. In addition, it is possible to control the rotating speed of the rotor 40 to be reduced as the speed of the winds in the same direction as the spreading direction of the rotor 40 increases. In this manner, even when the direction and speed of the wind change, the spreading distance of the spread substance can be made substantially constant.

When the controller portion 83 controls the rotating speed of the rotor 40 based on the posture information, the controller portion 83 performs the control, for example, so as to increase the rotating speed of the rotor (the first rotor 410) arranged to the right to be higher than the rotating speed of the rotor (the second rotor 420) arranged to the left when the working device 3 is tilted to the right (when the right is lowered), and so as to increase the rotating speed of the rotor (the second rotor 420) arranged to the left to be higher than the rotating speed of the rotor (the first rotor 410) arranged to the right when the working device 3 is tilted to the left (when the left is lowered). That is, it is possible to control the rotating speeds of the rotors on the lower side to be higher than the rotating speed of the rotor on the higher side. In this manner, even when the posture of the working device 3 changes, the spreading distance of the spread substance can be made substantially constant.

When the controller portion 83 controls the rotating speed of the rotor 40 based on the position information, for example, when the current position where the tractor 2 is traveling is near the boundary line of the agricultural field, the controller portion 83 controls the rotating speed of the rotor 40 to be decreased or to be zero (stop). In addition, when there are a plurality of rotors 40, the controller portion 83 controls the rotating speed of the rotor on the side close to the boundary line of the agricultural field to be reduced or to be set to zero (stopped). In this manner, it is possible to avoid the spreading of the spread substance beyond the boundary line. The boundary line is, for example, a line indicating a field edge (a boundary line with a road, a boundary line with a building, a boundary line with other person's field), a boundary line between different crops, or the like.

As shown in FIG. 7, the work management system 100 further includes the height adjuster mechanism 91 and the posture adjustment mechanism 92.

The height adjusting mechanism 91 includes the lift cylinder 63 of the coupling device 6 and includes an electromagnetic control valve connected to the lift cylinder 63. When the electromagnetic control valve connected to the lift cylinder 63 receives a control signal from the controller portion 83, the electromagnetic control valve stretches and shortens the rod of the first lift cylinder 63L and the rod of the second shift cylinder 63R. In this manner, since the working device 3 connected to the coupling device 6 is moved upward and downward, the height of the rotor 40 can be adjusted.

In particular, the height adjuster mechanism 91 adjusts so that the height of the rotor 40 is always constant from the ground. For example, the controller portion 83 calculates the difference between the height detected by the height detector device 71 and the target height stored in advance in the memory of the management device 80, and drives the lift cylinder 63 so that the difference approaches to zero, thereby adjusting the height of the rotor 40. By adjusting the height of the rotor 40 from the ground by the height adjusting mechanism 91 so that the height of the rotor 40 is always constant, the spreading distance of the spread substance by the rotor 40 can be made substantially constant. In this manner, the variation in the spreading amount in the agricultural field can be suppressed.

The posture adjuster mechanism 92 includes a lift cylinder 63 of the coupling device 6 and includes an electromagnetic control valve connected to the lift cylinder 63. When receiving the control signal from the controller portion 83, the electromagnetic control valve connected to the lift cylinder 63 extends or shortens the rod of the first lift cylinder 63L or the second lift cylinder 63R. In this manner, the inclination of the working device 3 connected to the coupling device 5 in the vehicle width direction (the difference between the height of the left portion and the height of the right portion of the working device 3) changes, so that the posture of the working device 3 can be adjusted.

In particular, the posture adjustment mechanism 92 adjusts so that the inclination of the working device 3 (the inclination with respect to the horizontal plane) becomes small. The controller portion 83 drives the first lift cylinder 63L or the second lift cylinder 63R so that the inclination (the difference in height between the left portion and the right portion) of the working device 3 detected by the posture detector device 74 approaches to zero, thereby adjusting the posture of the working device 3. When the posture adjustment mechanism 92 performs the adjustment so that the inclination of the working device 3 (the inclination with respect to the horizontal plane) is reduced, the spreading distance of the spread substance due to the rotating of the rotor 40 can be made substantially constant. In this manner, the variation in the spreading amount in an agricultural field can be suppressed.

The work management method can be executed by the work management system 100 described above.

The work management method includes: an information obtaining step for obtaining the operation information representing the operation of the working device 3 that is activated by the power from the generator 15; a work management step for managing working of the working device 3 based on the operation information obtained by the information obtaining portion 81; and a control step for controlling the working device 3 based on the operation information obtained by the information obtaining portion 81.

In the information obtaining step, the wind speed information may be obtained by the information obtaining portion 81 in addition to the operation information. In this case, in the control step, the working device 3 is capable of being controlled based on the wind speed information obtained by the information obtaining portion 81.

The information obtaining step is executed by the information obtaining portion 81. The work management step is executed by the work management portion 82. The control step is executed by the controller portion 83. Since the information obtaining method by the information obtaining portion 81, the work management method by the work management portion 82, and the control method by the controller portion 83 are as described above, the description thereof will be omitted.

According to this work management method, it is possible to manage the working of the working machine 1 provided with the generator 15 that is configured to transmit the power to the working device 3 and to control the working device 3.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A structure body having a generator, comprising:
the structure body configured to be detachably attached to a traveling vehicle including: a transmission case; and a PTO shaft protruding from the transmission case; and
the generator attached to the structure body,
wherein the structure body includes:
 a first portion to be attached to the transmission case;
 a first attachment portion and a second attachment portion that constitute a second portion to which a working device is to be attached; and
 a third portion to which the generator is attached, the third portion having a through hole for projecting the PTO shaft,
wherein the first attachment portion is arranged to one side in a vehicle width direction of the traveling vehicle,
wherein the second attachment portion is arranged to another side in the vehicle width direction,
wherein the third portion is formed of a rear plate that communicates between the first attachment portion and the second attachment portion,
wherein the rear plate is disposed ahead of a rear end of the first attachment portion and a rear end of the second attachment portion,
and wherein the generator is attached to the rear plate and is disposed between the first attachment portion and the second attachment portion.

2. The structure body according to claim 1,
wherein the generator is driven by a rotating power from the PTO shaft.

3. The structure body according to claim 1,
wherein the rotating power from the PTO shaft is divided into a first path and a second path by a power divider portion of the PTO shaft,
wherein the rotating power transmitted from the first path is outputted from the PTO shaft projecting from the through hole,
and wherein the generator is activated by the rotating power transmitted through the second path.

4. The structure body according to claim 1, comprising a first side plate and a second side plate arranged separately in the vehicle width direction,
wherein the generator is arranged between the first side plate and the second side plate in the vehicle width direction.

5. The structure body according to claim 4, comprising a first front plate and a second front plate attached to a rear surface of the transmission case,
wherein the first front plate is connected to a front end portion of the first side plate,
and wherein the second front plate is connected to a front end portion of the second side plate.

6. The structure body according to claim 1,
wherein the generator is arranged above the PTO shaft under a state where the structure body is attached to the transmission case.

7. The structure body according to claim 1,
wherein an output voltage of the generator is sixty volts or less.

8. The structure body according to claim 1,
wherein the traveling vehicle is a tractor.

* * * * *